United States Patent [11] 3,609,135

| [72] | Inventor | Joachim Ribka |
| | | Offenbach am Main, Germany |
| [21] | Appl. No. | 874,992 |
| [22] | Filed | Nov. 7, 1969 |
| [45] | Patented | Sept. 28, 1971 |
| [73] | Assignee | Farbwerke Hoechst Aktiengesellschaft |
| | | Vormals Meister Lucius |
| | | Bruening, Frankfurt am Main, Germany |
| [32] | Priority | Nov. 9, 1968 |
| [33] | | Germany |
| [31] | | P 18 08 015.4 |

[54] WATER-INSOLUBLE BENZIMIDAZOLONE CONTAINING MONOAZO DYESTUFFS
10 Claims, No Drawings

[52] U.S. Cl. .................................................. 260/152,
260/37, 260/309.7, 106/22, 106/288, 117/154
[51] Int. Cl. .................................................. C09b 29/32
[50] Field of Search.......................................... 260/152

[56] References Cited
UNITED STATES PATENTS

| 3,109,842 | 11/1963 | Schilling et al. | 260/157 |
| 3,328,384 | 6/1967 | Dietz et al. | 260/157 |

*Primary Examiner*—Charles B. Parker
*Assistant Examiner*—Donald M. Papuga
*Attorney*—Curtis, Morris & Safford ABSTRACT: Water-insoluble dyestuffs of the general formula

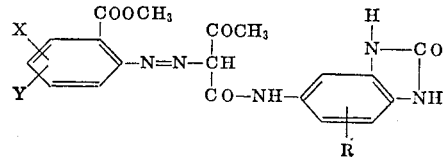

wherein X represents a hydrogen or halogen atom, a methyl, trifluoromethyl, methoxy or nitro group, Y a hydrogen or halogen atom and R a hydrogen or halogen atom, a methyl or methoxy group.

Said pigments can be used, for instance, for dyeing or printing plastics, caoutchouc, natural and synthetic resins, textile fibrous materials or paper. Furthermore, they can be employed for the preparation of printing inks, lacquers and dispersion paints. The novel pigments possess good to very good fastness properties.

WATER-INSOLUBLE BENZIMIDAZOLONE CONTAINING MONOAZO DYESTUFFS

The present invention relates to new valuable monoazo dyestuffs of the general formula

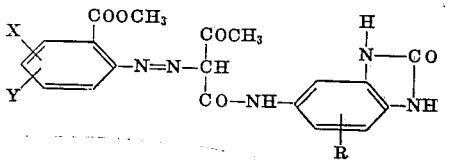

in which X represents hydrogen or halogen, methyl, trifluoromethyl, methoxy or nitro, Y, hydrogen or halogen and R, hydrogen or halogen, methyl or methoxy, as well as to a process for their manufacture which comprises coupling diazonium compounds of aromatic amines of the general formula

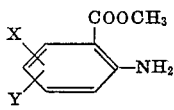

with coupling components of the general formula

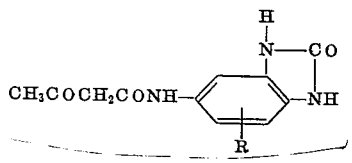

in which X, Y and R have the above meaning.

The anthranilic-acid methyl esters used as diazo components are known or are prepared according to known methods. The compounds used as coupling components may be prepared by reacting diketene with the corresponding 5-amino-benzimidazolones.

The coupling reaction may be effected in known manner, for example inorganic solvents, especially in aqueous medium, advantageously in the presence of an anion-active, kation-active or nonionic dispersing agent and/or in the presence of an organic solvent.

In order to obtain an especially favorable crystalline structure, it is convenient to heat the coupling component for some time, for example at the boil or under pressure at temperatures exceeding 100° C., optionally in the presence of organic solvents, such as dichlorobenzene or dimethylformamide, or of resin soap. The dyestuffs of the invention yield especially pure and fast dyeings when, after coupling, they are after-treated with organic solvents such as pyridine, dimethylformamide, alcohol, glycol, gylcol-monomethyl ether, glacial acetic acid, chlorobenzene, dichlorobenzene or nitrobenzene, in form of moist press cakes or dry powders, under reflux temperature or under pressure at high temperatures, or when the dyestuffs are subsequently ground, with grinding agents added.

Coupling of the dyestuffs is also possible in the presence of support substances suitable for the manufacture of color lakes.

The new pigment dyestuffs are suitable for the manufacture of printing inks, color lakes and dispersion paints, for the dyeing of caoutchouc, plastics and natural or synthetic resins. Furthermore, the new dyestuffs are convenient for pigment printing on substrates, especially fibrous materials or other structures having a flat surface, for example paper. They may serve also for other purposes, for example, in a finely divided form, for coloration of rayon from viscose or cellulose ethers and cellulose esters, polyamides or polyurethanes in the spinning mass or for coloring paper.

The pigments are easy to work in the above-mentioned media. The dyeings display good fastness to light, weathering and migration. They show good tinctorial strength and, in many cases, pure, brilliant shades. Furthermore, they are resistant to the action of heat and chemicals, for example solvents.

The following examples illustrate the invention, the parts being by weight unless stated otherwise.

EXAMPLE 1

18.5 parts of 1-amino-5-chlorobenzene-2-carboxylic acid methyl ester are stirred for 1 hour with 60 parts by volume of 5 N hydrochloric acid, until the hydrochloride is obtained. Then 200 parts by volume of water are added and diazotization is effected with 20 parts by volume of 5 N sodium nitrite solution.

This diazo solution is allowed to run, at 20° C., with thorough stirring, into an acetic acid suspension of the coupling component which had been prepared as follows:

24 parts of 5-acetoacetylamino-benzimidoazolone are stirred at room temperature with 200 parts by volume of water and dissolved by the addition of 60 parts by volume of 5 N sodium hydroxide solution. The resulting solution is clarified with charcoal and the clarified solution is added dropwise, within about 30 minutes, while stirring, to a solution prepared from 300 parts by volume of water, 41 parts by volume of glacial acetic acid and 80 parts by volume of 5 N sodium hydroxide solution.

The coupling is rapidly completed. The dyestuff obtained is suction filtered, washed with water, dried and pulverized. The yellow pigment so obtained is heated for 3 hours at 130° C. with 500 parts by volume of dimethylformamide. The solution is then suction filtered, washed with methanol and the dyestuff is dried. A yellow soft-grained pigment is obtained having good tinctorial strength and a pure shade. When incorporated into polyvinyl chloride, a lacquer, a printing ink or a dispersion paint, it yields yellow dyeings having high fastness to light and perfect fastness to overvarnishing and very good fastness to bleeding in polyvinyl chloride. If the pigment is incorporated in an oil-in-water emulsion or a water-in-oil emulsion, printing pastes are obtained which allow the dyeing of textile fabrics, for example cotton or polyester fibers in yellow shades with good fastness to light and good fastness to drycleaning.

The incorporation into polyvinylchloride is effected, for example, according to the following process:

16.5 parts of a plasticizer mixture consisting of equal parts of dioctyl-phthalate and dibutyl-phthalate are mixed with 0.05 part of dyestuff and 0.25 part of titanium dioxide. Then 33.5 parts by weight of polyvinyl chloride are added. The mixture is friction-rolled for 10 minutes on a double-roller mill, the formed film being continuously cut with a spatula and rolled. During the processing one roller is kept at a temperature of 40° C. while the other is kept at 140° C. Thereafter, the mixture is stripped off as a film and pressed for 5 minutes at 160° C. between two polished metal plates.

The following table contains a number of further dyestuffs obtainable in analogous manner as well as shades of these dyestuffs used in graphical printing:

| Diaazocomponents | Coupling component | Shade |
| --- | --- | --- |
| 1-amino-5-chloro-benzene-2-carboxylic acid methyl ester. | 6-chloro-5-acetoacetylamino-benzimidazolone. | Reddish yellow. |
| Do | 7-chloro-5-acetoacetylamino-benzimidazolone. | Do. |
| Do | 7-bromo-5-acetoacetylamino-benzimidazolone. | Do. |
| Do | 6-methyl-5-acetoacetyl-amino-benzimidazolone. | Do. |
| Do | 7-methoxy-5-acetoacetyl-amino-benzimidazolone. | Do. |
| 1-amino-5-nitrobenzene-2-carboxylic acid methyl ester. | 5-acetoacetylamino-benzimidazolone. | Yellowish orange. |

Table — Continued

| Diazocomponents | Coupling component | Shade |
|---|---|---|
| 1-aminobenzene-2-carboxylic acid methyl ester. | ......do............ | Medium yellow. |
| 1-amino-4-chlorobenzene-2-carboxylic acid methyl ester. | ......do............ | Reddish yellow. |
| 1-amino-4-bromobenzene-2-carboxylic acid methyl ester. | ......do............ | Do. |
| 1-amino-5-methylbenzene-2-carboxylic acid methyl ester. | ......do............ | Do. |
| 1-amino-5-trifluoromethyl-benzene-2-carboxylic acid methyl ester. | ......do............ | Do. |
| 1-amino-4,6-dichlorobenzene-2-carboxylic acid methyl ester. | ......do............ | Do. |
| 1-amino-5-methoxybenzene-2-carboxylic acid methyl ester. | ......do............ | Do. |

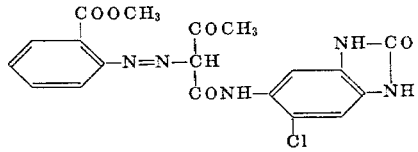

I claim:
1. A dyestuff of the formula

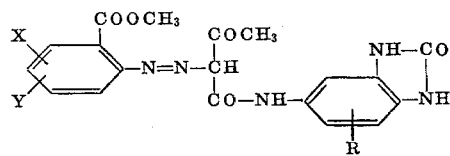

wherein X is hydrogen, chlorine, bromine, methyl, trifluoromethyl, methoxy or nitro, Y is hydrogen, chlorine or bromine and R is hydrogen, chlorine, bromine, methyl or methoxy.

2. The dyestuff of the formula

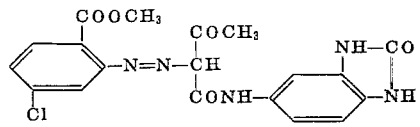

3. The dyestuff of the formula

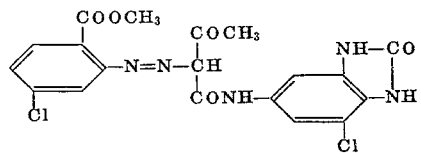

4. The dyestuff of the formula

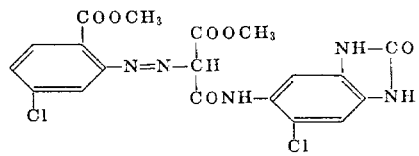

5. The dyestuff of the formula

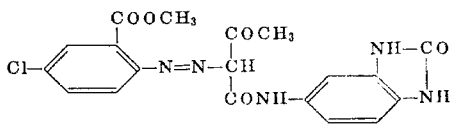

6. The dyestuff of the formula

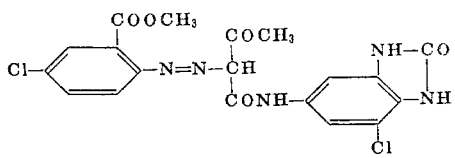

7. The dyestuff of the formula

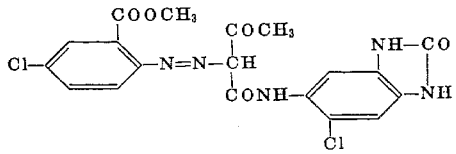

8. The dyestuff of the formula

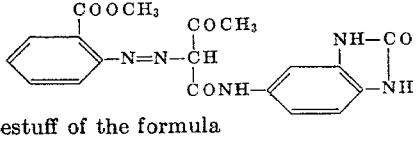

9. The dyestuff of the formula

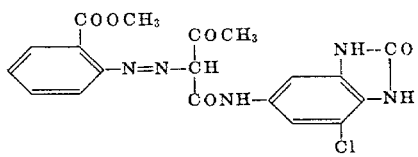

10. The dyestuff of the formula